United States Patent Office 3,353,976
Patented Nov. 21, 1967

3,353,976
REFRACTORY AND METHOD
Frank F. Raine and Gerald E. Cooper, Mexico, Mo., assignors to Kaiser Aluminum & Chemical Corporation, Oakland, Calif., a corporation of Delaware
No Drawing. Filed Jan. 24, 1966, Ser. No. 522,376
11 Claims. (Cl. 106—65)

ABSTRACT OF THE DISCLOSURE

There is disclosed a method of making a synthetic bauxite by adding finely divided silica, titania, and iron oxide to a high purity alumina. The synthetic bauxite is advantageous in having a higher density, and consequently lower porosity, than naturally occurring bauxites of similar chemical composition. The making of high alumina refractory shapes from such synthetic bauxite is also disclosed and such refractories are shown to have higher strengths and greater dimensional stability than similar refractory shapes made from comparable natural bauxites.

This invention concerns refractories, refractory materials, and methods of making them.

High alumina refractories have long been known in the art, and it has been customary to make them by admixing bauxite or bauxitic materials, usually after calcining at from 2800 to 2900° F. to drive off water by hydration, with other refractory materials, for example fireclays. The bauxites used in making high alumina refractories are generally substantially $Al_2O_3 \cdot 3H_2O$, but the alumina hydrates present in them can range in water content down to $Al_2O_3 \cdot H_2O$. Besides alumina hydrate, the bauxites contain more or less impurities, for example iron oxide and silica, the higher purity bauxites being generally preferred for refractory applications.

The proven reserves of bauxite, particularly high grade bauxite, are limited and there has been a continuing search for a synthetic material which can be substituted for natural bauxite. Additionally, there is also sought a synthetic bauxite which will have improved properties over those of naturally occurring materials.

It has now been found, according to this invention, that a non-fused synthetic bauxite of improved properties for refractory purposes can be made from a composition consisting essentially of sufficient alumina hydrate material to yield from 85 parts to 95 parts by weight $Al_2O_3$, sufficient silica yielding material to yield from 4 to 8 parts by weight $SiO_2$, sufficient titania yielding material to yield from 2 to 4 parts by weight $TiO_2$, and sufficient iron oxide yielding material to yield from 1 to 2 parts by weight $Fe_2O_3$.

In order to form a synthetic bauxite material from the above admixture it is necessary to compact it under pressure, for example into the form of briquettes, and to calcine it, for example in a rotary kiln, preferably at a temperature of from 2800° F. to 3100° F.

Synthetic bauxite made according to this invention can be used to make high alumina bricks, for example by admixing from 50 to 90 parts by weight of the synthetic bauxite with from 10 to 50 parts by weight clay material and forming this admixture into shapes, as by power pressing. The clay material used in making shapes from the synthetic bauxite of this invention can be either plastic or flint fireclay and may be partially calcined fireclay. The type and amount of clay material used will depend on the total desired $Al_2O_3$ content of the refractory shapes, as will be understood by those skilled in the art. The synthetic bauxite of this invention can also be used as aggregate in the manufacture of castable refractories, plastic refractories, and mixes suitable for ramming or gunning.

The alumina-hydrate material used in the practice of this invention is any such material consisting essentially of $Al_2O_3$ and $H_2O$ in chemical combination. A particularly suitable material is the alumina hydrate, $Al(OH)_3$, produced by the Bayer process of producing alumina from bauxite. Such material is available which contains over 99% $Al_2O_3$ plus $H_2O$. However, other alumina hydrates of different water content can be used providing they are of the requisite purity. While fine grinding of the alumina hydrate does promote reaction between the alumina and the additives, the expense of grinding is not necessary. Thus, for example, a commercially available aluminum hydrate, nearly 50% of which is retained on a 150 mesh screen, has been successfully used in the practice of this invention.

The silica yielding material will be finely divided, a major portion, and preferably 95%, passing a 325 mesh screen. Suitable silica yielding materials are volatilized silica, diatomaceous earth, pulverized sand, rice hull ash, geyerite or other opaline silicas, tripoli and clay, either raw or calcined.

The titania yielding material is also finely divided, a major portion, and preferably 95%, passing a 325 mesh screen, and can be any such material which will form, upon heating, $TiO_2$. A suitable material is finely divided $TiO_2$ itself, for example in the form of rutile.

The iron oxide yielding material is also finely divided, a major portion, and preferably 95%, passing a 325 mesh screen. Suitable iron oxide yielding materials are millscale, LD steelmaking converter dust, $Fe_2O_3$, and the like.

It is an advantage of synthetic bauxite made according to this invention that it shows a lower porosity, a lower absorption, and a higher specific gravity than comparable calcined natural bauxites. For example, bulk densities as high as 3.33 g./cc. can be obtained; this is to be compared with bulk densities of from 2.86 to 2.95 g./cc. obtainable with a natural bauxite from Demerara, British Guiana. It is a further advantage of the synthetic bauxite of this invention that refractory shapes made with it show higher strengths, both at room temperature and elevated temperatures, lower spalling loss, greater dimensional stability on reheating, and better strengths after reheating than do shapes made with a natural bauxite of similar chemical composition.

Example 1

As an example of the practice of this invention, a synthetic bauxite was made by admixing 92.3 parts by weight Bayer process alumina hydrate, 4.4 parts by weight volatilized silica, 2.3 parts by weight rutile, and 1 part by weight red iron oxide, together with one part by weight of a temporary organic binder and 15 parts by weight water. The alumina hydrate analyzed 65% $Al_2O_3$ and 35% ignition loss, substantially all $H_2O$. The volatilized silica substantially all passed a 325 mesh screen and analyzed 96.7% $SiO_2$, 0.3% $Al_2O_3$, 0.3% $Fe_2O_3$ and 2.7% ignition loss, substantially all carbon. The titania analyzed 94.0% $TiO_2$, 1.1% $SiO_2$, 1.5% $ZrO_2$, 2.7% $Fe_2O_3$, 0.6% $Al_2O_3$ and 0.1% ignition loss; over 99% passed a 325 mesh screen. The iron oxide analyzed over 99.5% $Fe_2O_3$ and about 99% passed a 325 mesh screen. The dampened admixture was compacted into pellets at a pressure of about 7500 p.s.i., the compacted pellets being fired at a temperature of 2900° F. in a periodic reheat furnace.

The synthetic bauxite produced had a chemical composition of 89.1% $Al_2O_3$, 6.2% $SiO_2$, 3.2% $TiO_2$, and 1.5% $Fe_2O_3$ and had a porosity of 15.8%, an absorption of 5.3% and a bulk density of 2.98 g./cc. This is to be compared with a natural bauxite produced at Demerara, British Guiana, which, after calcination, had substantially the same chemical composition as the synthetic bauxite of this example and which had the following properties: 17.6 to 18.1% porosity, 6.0 to 6.3% absorption, and 2.88 to 2.92 g./cc. bulk density. The improved properties of the synthetic bauxite are apparent.

As an example of the use of the synthetic bauxite according to this invention to make refractory shapes, a composition of 60 parts of the synthetic bauxite made according to Example 1 and passing a 6 mesh screen and 90% retained on a 65 mesh screen, 20 parts of the same synthetic bauxite pulverized so that 95% passed a 65 mesh screen, and 20 parts by weight plastic fireclay were admixed with three-quarter parts by weight of a lignin sulfonate temporary binder and 4.6% tempering water. The mixture was pressed into brick shapes in a dry press at 3000 p.s.i. After burning to cone 14–15, the brick had the properties set forth in Table I.

TABLE I

|  | Natural | Synthetic |
| --- | --- | --- |
| Modulus of Rupture (p.s.i.) | 1,375 | 2,440 |
| Cold Crushing Strength (p.s.i.) | 6,006 | 8,468 |
| Hot Load Deformation (percent): |  |  |
| 2,640° F | 2.15 | 0.05 |
| 2,750° F | 3.94 | 2.44 |
| 2,732° F. Reheat: |  |  |
| Linear change (percent) | +4.3 | +1.4 |
| Mod. of Rupt. (p.s.i.) | 914 | 1,345 |
| 2,910° F. Reheat: |  |  |
| Linear change (percent) | +5.5 | +2.1 |
| Mod. of Rupt. (p.s.i.) | 1,025 | 1,097 |
| 3,000° F. Reheat: |  |  |
| Linear change (percent) | +6.8 | +0.6 |
| Mod. of Rupt. (p.s.i.) | 1,276 | 1,479 |
| Cone 32 Reheat: Linear change (percent) | +6.7 | −0.1 |

For comparison purposes, bricks of the same composition, but using a calcined natural bauxite instead of the synthetic bauxite, were processed in precisely the same way. The calcined natural bauxite had the same grain sizing as the synthetic bauxite and had the following typical chemical composition: 88.9% $Al_2O_3$, 6.2% $SiO_2$, 3.2% $TiO_2$, and 1.7% $Fe_2O_3$. The properties of these brick after firing are also given in Table I. It can be seen that bricks made with the synthetic bauxite of this invention show higher strength, both modulus of rupture and cold crushing, at room temperature, show less hot load deformation at both 2640° F. and 2750° F., and show both greater dimensional stability and better strength after reheating to the various temperatures indicated in Table I.

*Example 2*

As a further example of the practice of this invention, 92.3 parts of the alumina hydrate of Example 1 were admixed with 2.3 parts rutile ($TiO_2$), 1.0 part iron oxide, and 4.4 parts of the various sources of $SiO_2$ listed in Table II. These compositions were mixed with one part of a temporary lignin binder and a tempering amount of water and pressed into pellets at a pressure of 10,625 p.s.i. After firing for 3 hours at 3,000° F., the synthetic bauxites had the properties listed in Table II.

TABLE II

| Specimen | A | B | C | D | E | Natural Bauxite |
| --- | --- | --- | --- | --- | --- | --- |
| Type silica | (1) | (2) | (3) | (4) | (5) |  |
| Grain: |  |  |  |  |  |  |
| Porosity (vol. percent) | 3.7 | 9.4 | 4.0 | 5.0 | 6.6 | 18.0 |
| Bulk density (g./cc.) | 3.33 | 3.23 | 3.28 | 3.17 | 3.15 | 2.90 |
| Brick: Hot load deformation (2,640° F.) | 0.39 | 0.66 | 0.00 | 0.28 | 0.17 | 1.32 |
| Reheat, 2,732° F: |  |  |  |  |  |  |
| Linear change (percent) | +1.5 | +0.7 | +1.3 | +0.6 | +1.1 | +3.2 |
| Mod. Rupt. (p.s.i.) | 1,704 | 1,150 | 2,010 | 2,060 | 2,120 | 655 |
| Absorption (percent) | 8.0 | 8.2 | 8.3 | 7.7 | 8.2 | 11.1 |
| Reheat, 2910° F: |  |  |  |  |  |  |
| Linear change (percent) | +2.9 | +2.9 | +3.1 | +2.6 | +2.3 | +5.2 |
| Mod. Rupt. (p.s.i.) | 1,098 | 551 | 1,765 | 1,350 | 770 | 322 |
| Absorption (vol. percent) | 8.9 | 9.3 | 8.9 | 8.8 | 8.4 | 13.1 |

1 Volatilized silica.
2 Silica sand.
3 Sil-O-Cel.
4 Tripoli.
5 Super Sil.

As an example of the use of the synthetic bauxites of this invention, bricks were made from compositions containing, as aggregate, 60 parts by weight of each of the synthetic bauxites produced in Example 2. Forty parts of the bauxite passed a 6 mesh screen and were 90% retained on a 65 mesh screen, while 20 parts of the same bauxite were pulverized so that 95% passed a 65 mesh screen. To the 60 parts synthetic bauxite were added 20 parts plastic clay and 20 parts calcined flint clay. After addition of a tempering amount of water, these compositions were pressed into brick under a pressure of 3000 p.s.i. After firing to cone 15–16, the brick had the properties given in Table II. For comparison purposes, the properties of brick of a similar chemical composition and similarly processed, but made with calcined natural bauxite as aggregate, are also given in Table II.

It will be noted that brick made with the synthetic bauxite of this invention have an expansion of less than about 2% when reheated to 2732° F. and less than about 3% or less when reheated to 2910° F.

In the specification and claims, percentages and parts are by weight unless otherwise indicated, except that porosities are given in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at p. 963. For example, a size passing a 100 mesh screen corresponds to 147 microns, and that passing 200 mesh, to 74 microns. Analyses of mineral components are reported in the usual manner, expressed as simple oxides, e.g. $Al_2O_3$, $SiO_2$, although the components may actually be present in various combinations, e.g., as an alumina silicate. Cone numbers used refer to the Standard Pyrometric Cones (manufactured by Edward J. Orton Ceramic Foundation) used to measure the combined effect of time and temperature in the firing of ceramic products. Thus, for example, "cone 15" represents a heating to 2595° F. (1425° C.) at a rate of 108° F. (60° C.) per hour which is equivalent to a heating to 2608° F. (1430° C.) at a rate of 270° F. (150° C.) per hour.

By the term "non-fused" it is meant that the synthetic bauxite of this invention is formed by a solid state reaction, and not by melting and casting the composition. However, it will be understood that minor amounts of a liquid phase may be transiently formed during the calcining of the briquetted composition.

Having now described the invention,
What is claimed is:
1. A fired synthetic refractory composition made from a batch consisting essentially of alumina hydrate material in an amount sufficient to yield from 85 to 95 parts by weight $Al_2O_3$, sufficient finely divided silica yielding mate- rial to yield from 4 to 8 parts by weight $SiO_2$, sufficient finely divided titania yielding material to yield from 2 to 4 parts by weight $TiO_2$, and sufficient finely divided iron oxide yielding material to yield from 1 to 2 parts by weight $Fe_2O_3$.

2. A composition according to claim 1 wherein said alumina hydrate material is substantially $Al(OH)_3$.

3. Method of making synthetic bauxite comprising admixing alumina hydrate material in sufficient amount to yield from 85 to 95 parts by weight $Al_2O_3$, sufficient finely divided silica yielding material to yield from 4 to 8 parts by weight $SiO_2$, sufficient finely divided titania yielding material to yield from 2 to 4 parts by weight $TiO_2$, and sufficient finely divided iron oxide yielding material to yield from 1 to 2 parts by weight $FeO_3$; compacting said admixture under pressure; and calcining said compacted admixture.

4. Method according to claim 3 wherein said calcination is carried out at a temperature of from 2800° F. to 3100° F.

5. Method according to claim 3 wherein said compacted admixture is formed into pellets.

6. Method according to claim 3 wherein said calcination is carried out at a temperature of about 2900° F.

7. Method of making a volume stable high alumina refractory shape comprising: admixing from 50% to 90% by weight synthetic bauxite made according to claim 3 with from 10% to 50% by weight clay material; forming said admixture into a shape; and firing said shape.

8. Method of making a high alumina refractory shape according to claim 7 wherein said shape is fired to cone 14–15.

9. Method according to claim 7 wherein about 60% by weight synthetic bauxite is admixed with about 40% by weight clay material.

10. Method according to claim 7 wherein about 80% synthetic bauxite material is admixed with about 20% by weight clay material.

11. A fired refractory shape made from a batch consisting essentially of 50 to 90 parts by weight of the fired synthetic bauxite of claim 1 and from 10 to 50 parts by weight clay, said fired shape being characterized by an expansion of less than about 2% when reheated to 2732° F.

References Cited

UNITED STATES PATENTS

| | | |
|---|---|---|
| 1,268,532 | 6/1918 | Allen. |
| 1,528,639 | 3/1925 | Tone. |
| 2,360,841 | 10/1944 | Baumann. |
| 3,241,989 | 3/1966 | Wishon et al. _____ 106—65 |
| 3,251,699 | 5/1966 | Smith et al. _____ 106—65 |
| 3,282,579 | 11/1966 | Miller et al. _____ 106—65 |

TOBIAS E. LEVOW, *Primary Examiner.*

HELEN M. McCARTHY, JAMES E. POER,
*Examiners.*